Figure 2:
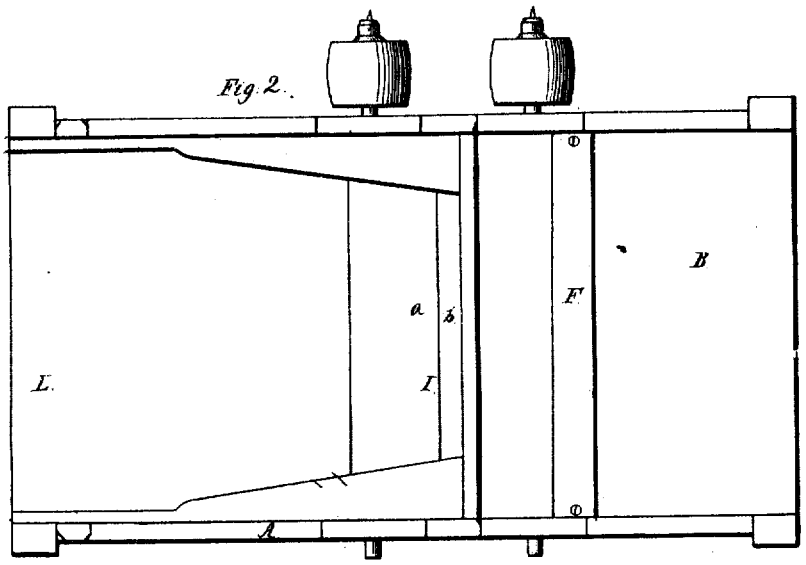
Figure 3:
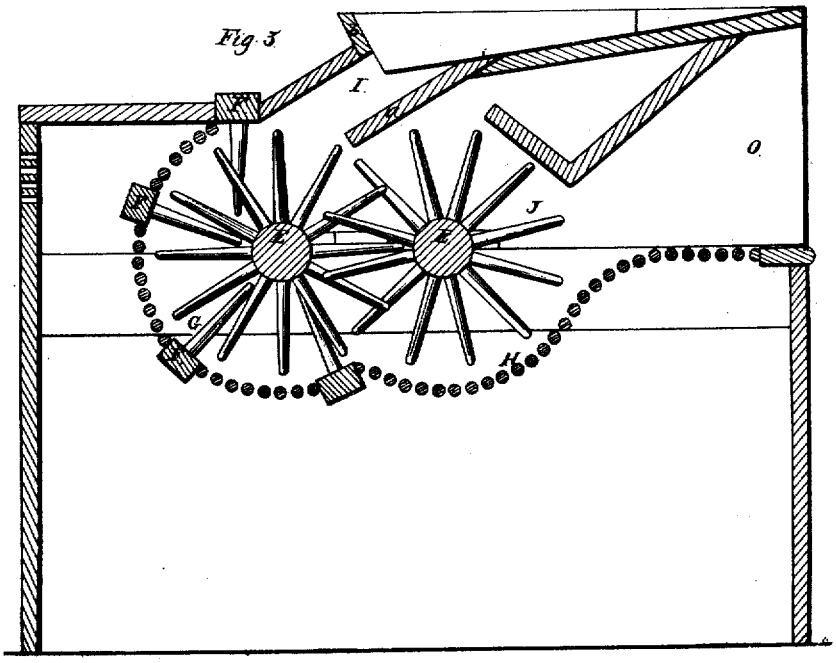

8295X
No Printed Specification Available
2 Sheets—Sheet 1.
S. P. MASON.
COTTON PICKER.
Patented July 8, 1834.
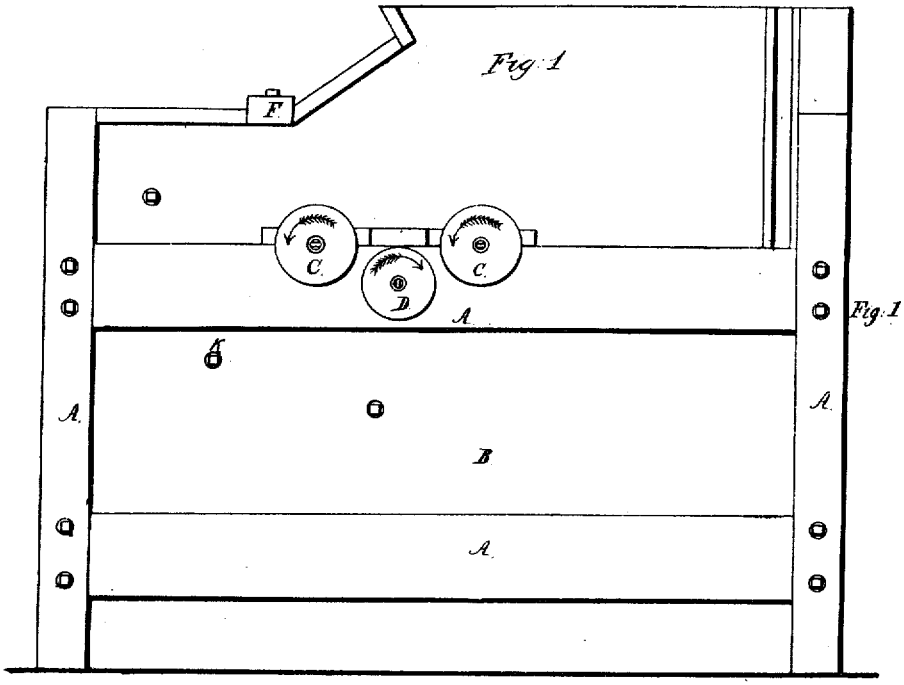
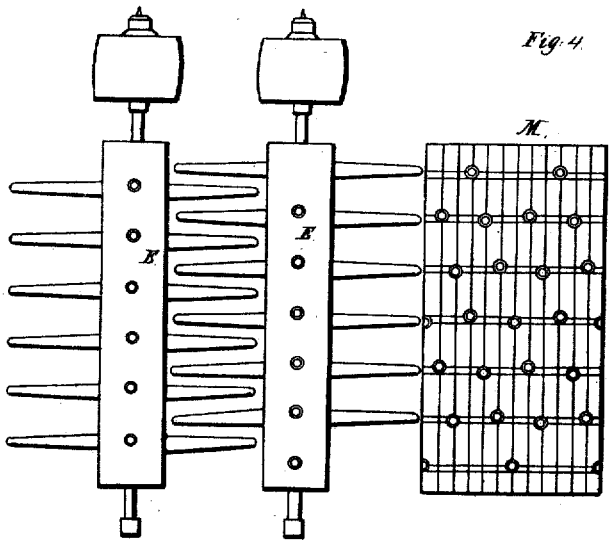
THE NORRIS PETERS CO., PHOTO-LITHO., WASHINGTON, D. C.

No Printed Specification

8295X

2 Sheets—Sheet 2.

S. P. MASON.

COTTON PICKER.

Patented July 8, 1834.

THE NORRIS PETERS CO., PHOTO-LITHO., WASHINGTON, D. C.

7/8/1834 8295X

July 8. 1834 507

Samuel P. Mason. Killingly Ct.

Letters Patent

The Schedule referred to in these Letters Patent and making part
of the same, containing a description in the words of the said Samuel
P. Mason himself of his improvement, in the art of whipping
and cleaning cotton. —

To all to whom these presents shall come;
Be it known that I Samuel P. Mason of Killingly in the County
of Windham and State of Connecticut have invented a new and
useful improvement in the art of whipping and cleaning cotton pre-
paratory to the next operation in its manufacture viz picking, and
that the following inclusive of the plates hereunto annexed is a full and
exact description of the construction and operation of the said ma
chine as invented by me Viz
Horizontal Rotary Stationary Cotton Whipper
A machine for whipping cotton and cleaning it from seeds & dirt
also for breaking the hard bunches very fine, leaving the cotton light
and well prepared for Picking: described as follows.
Plate 1. Exhibits a vertical projection of the machine A. A. A. A.
the frame which may be made of wood or cast iron — B funnels,
which may be fastened to the sides of the frame by means of screws
or otherwise — [illegible] from the side of the machine. —
Plate 2. Exhibits the horizontal projection of the machine which is
funnel work and in which is framed a throat [illegible] between the angular
funnels a & b for the purpose of feeding in the cotton which comes in
contact with the stationary pins or fingers by means of the velocity of
the Horizontal shafts, D.E. as exhibited in Plate 4.
Plate 3, Exhibits a longitudinal section of the machine; [illegible]
its the throat and the funnels a & b as shown on Plate 2, [illegible]
only [illegible] funnel work with the exception of the opening C through

7/8/1834 8295X

518 which the cotton makes its escape at the end of the process. At the opposite end of the machine is a door which may be opened at pleasure for the purpose of taking out the dirt, seeds &c which by the operation of the machine are separated from the cotton and pass through a circular grating H constructed under and partly around the two horizontal shafts E.E. Said shafts are made of Iron or wood with pins or fingers projecting from their centres any distance that the size of the machine may require and revolve with a velocity of 1500 or 2000 revolutions per minute in the direction of the arrows on pulleys C.C. — Plate 1, by means of a belt passing under said pulleys and over binding pulley D.
The journals of the shafts run in boxes which are fastened to the sides of the frame A. as shown on plates 1 & 2.
The pins in the horizontal shafts are so arranged and constructed as to pass very close to corresponding pins or fingers in the four horizontal girts F.F. F.F. which lie crosswise of the frame equi distant from each other around the back shaft by means of which the hard bunches of the cotton are in the process broken very fine and the dirt and seeds separated therefrom and forced through the circular grating while the cotton thus cleaned and whipped is thrown out at the mouth C. — Plate 4. M. exhibits the surface of the shaft on a plane showing the arrangement of the pins which are represented by small circles. Y exhibits the manner in which the pins in the two shafts play into each other — L is a perspective view of the shaft Witnesses
Thomas Backus Jun
Thomas Backus.

Samuel P. Mason

C & L.
K.J.W.

636 [illegible]

Drawing